(No Model.) 10 Sheets—Sheet 1.
J. P. WRIGHT.
BOX FILLING MACHINE.
No. 595,234. Patented Dec. 7, 1897.
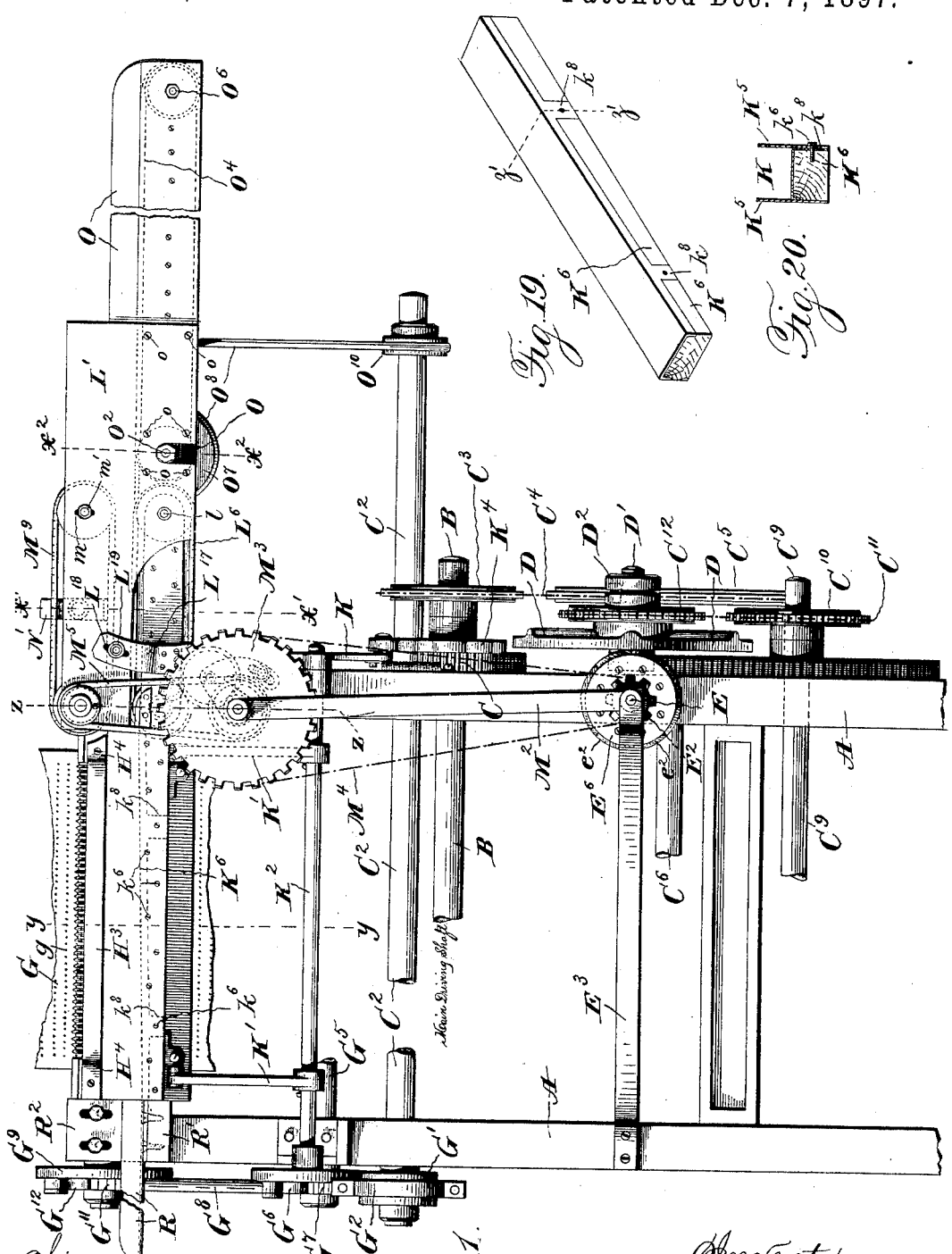

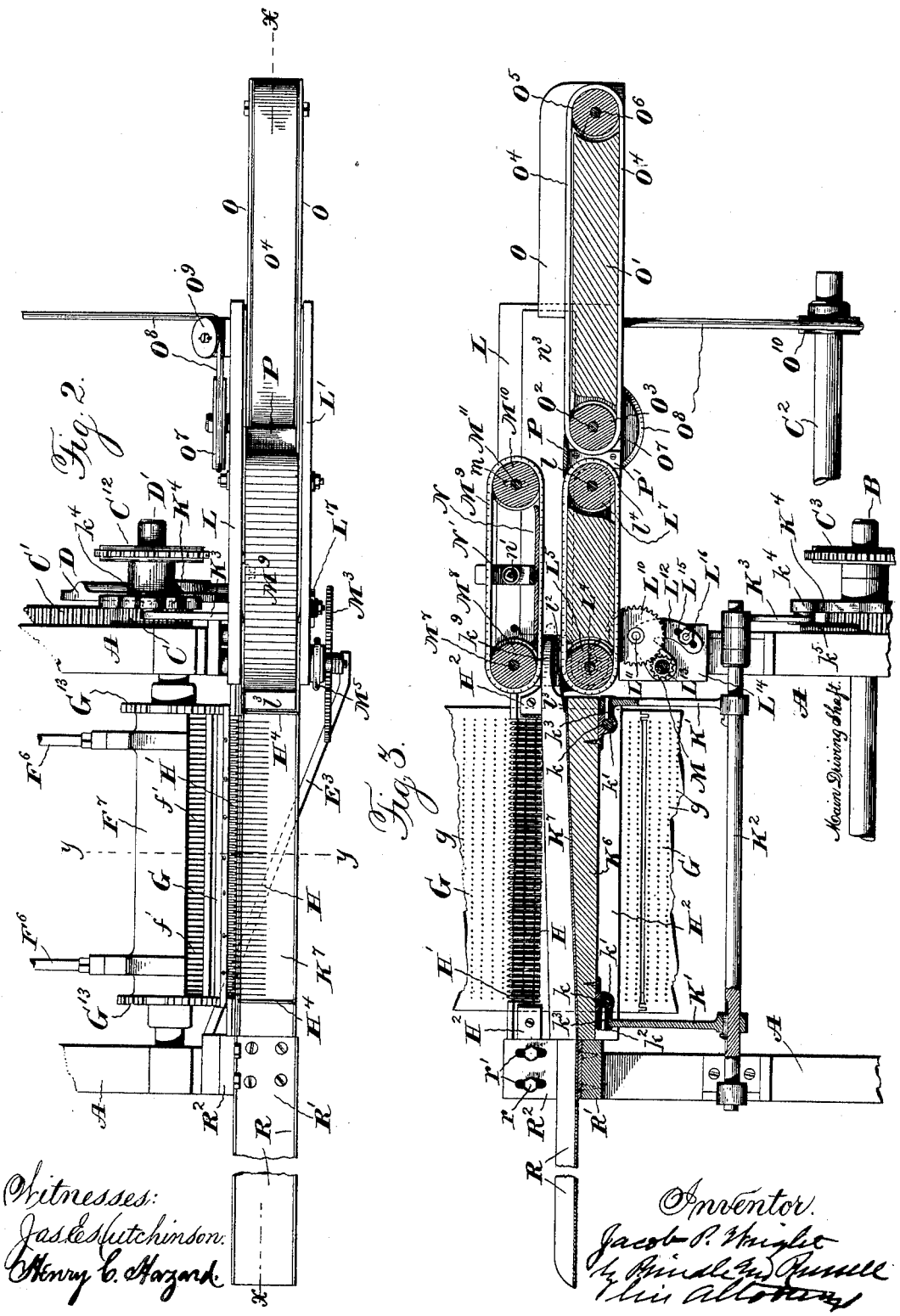

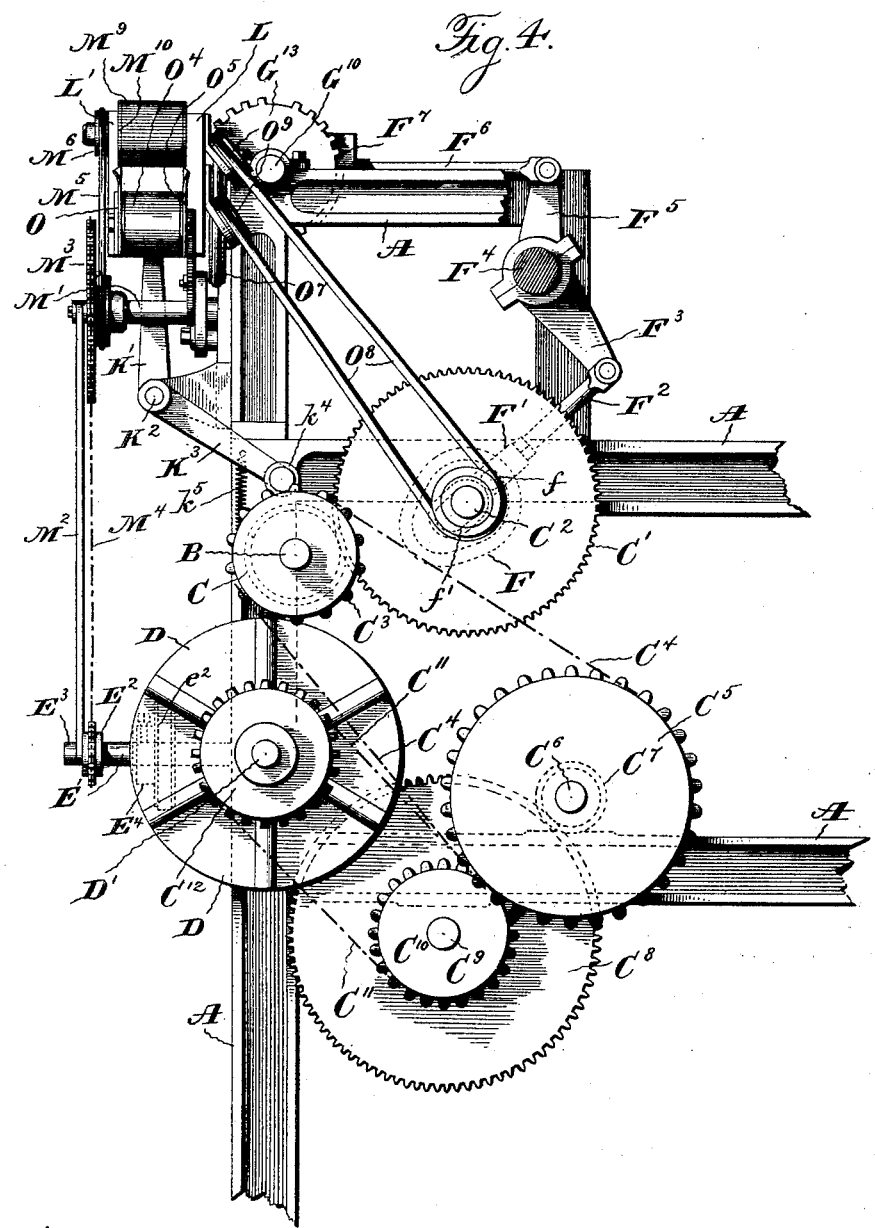

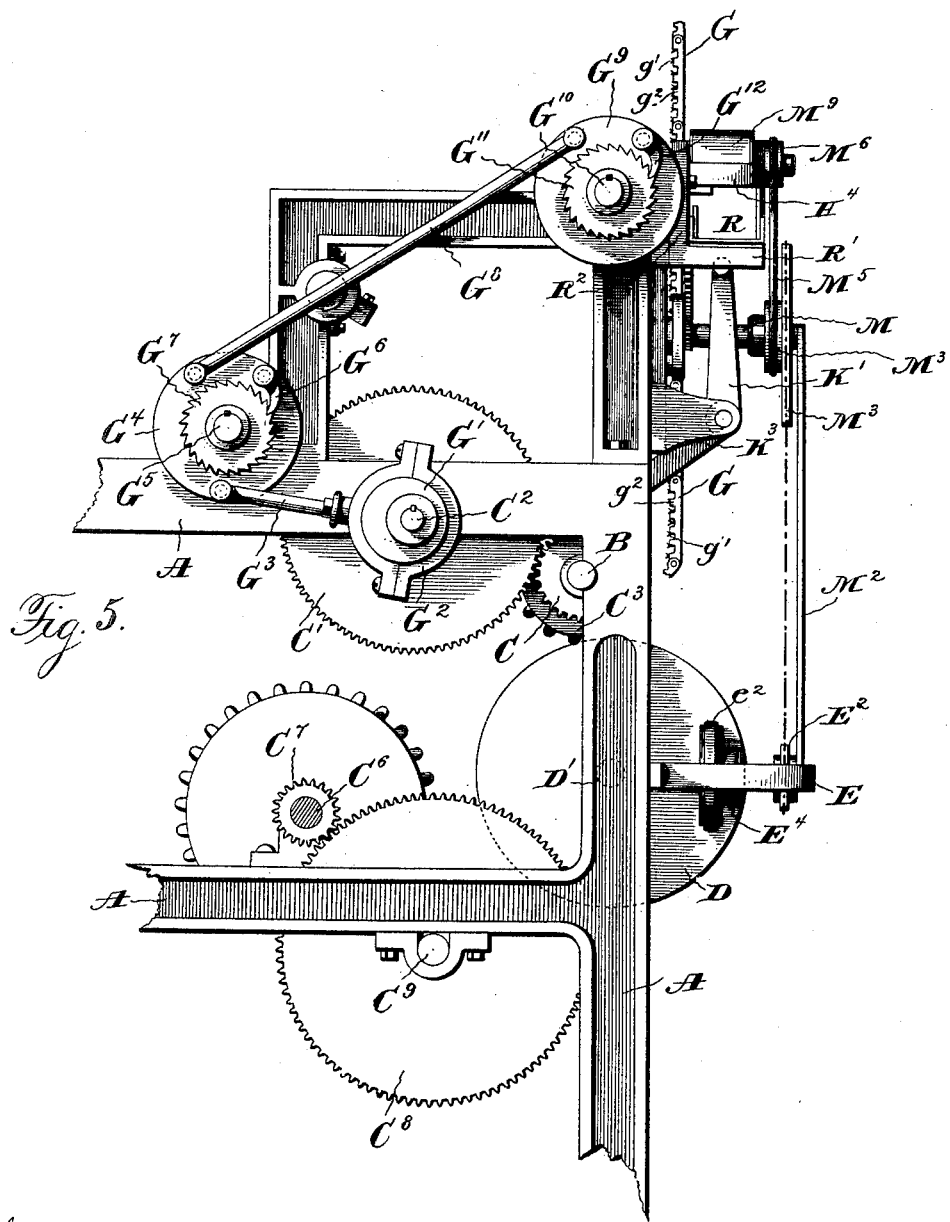

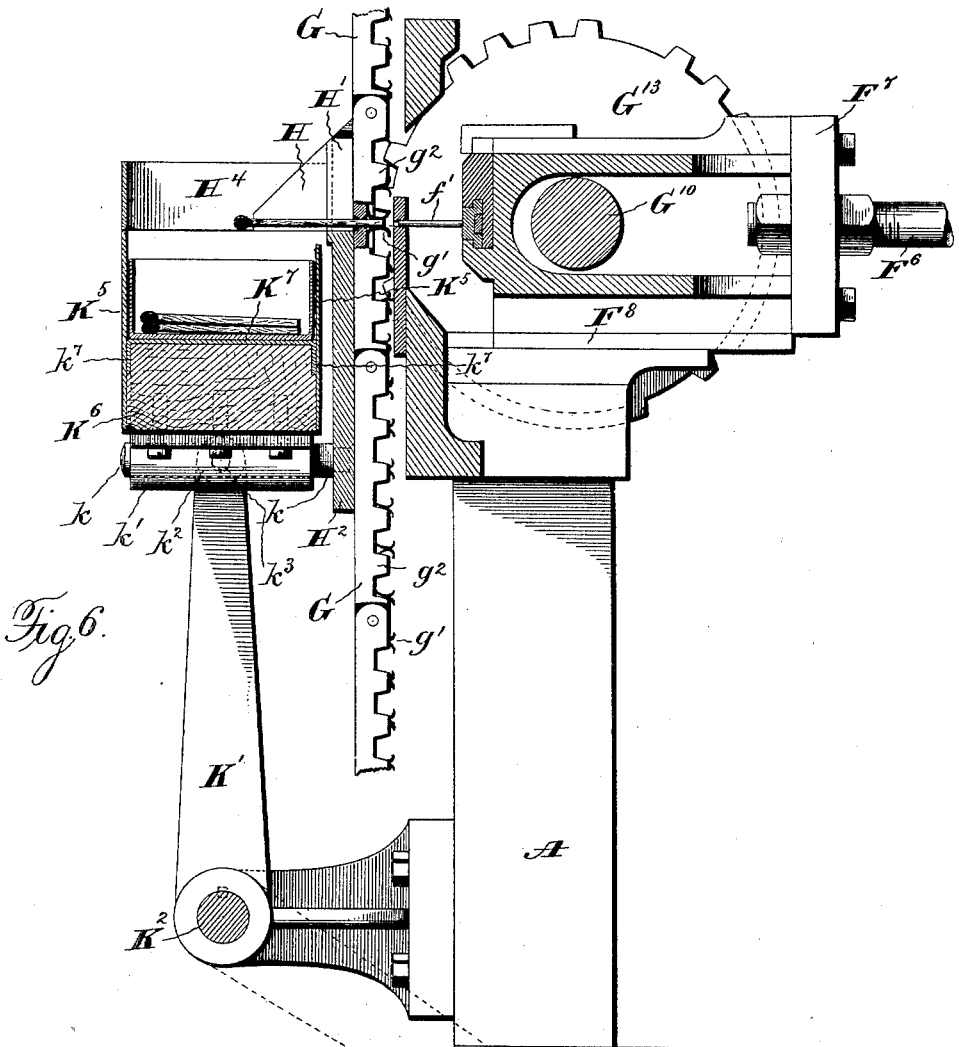

(No Model.)  J. P. WRIGHT.  10 Sheets—Sheet 6.
BOX FILLING MACHINE.
No. 595,234.  Patented Dec. 7, 1897.
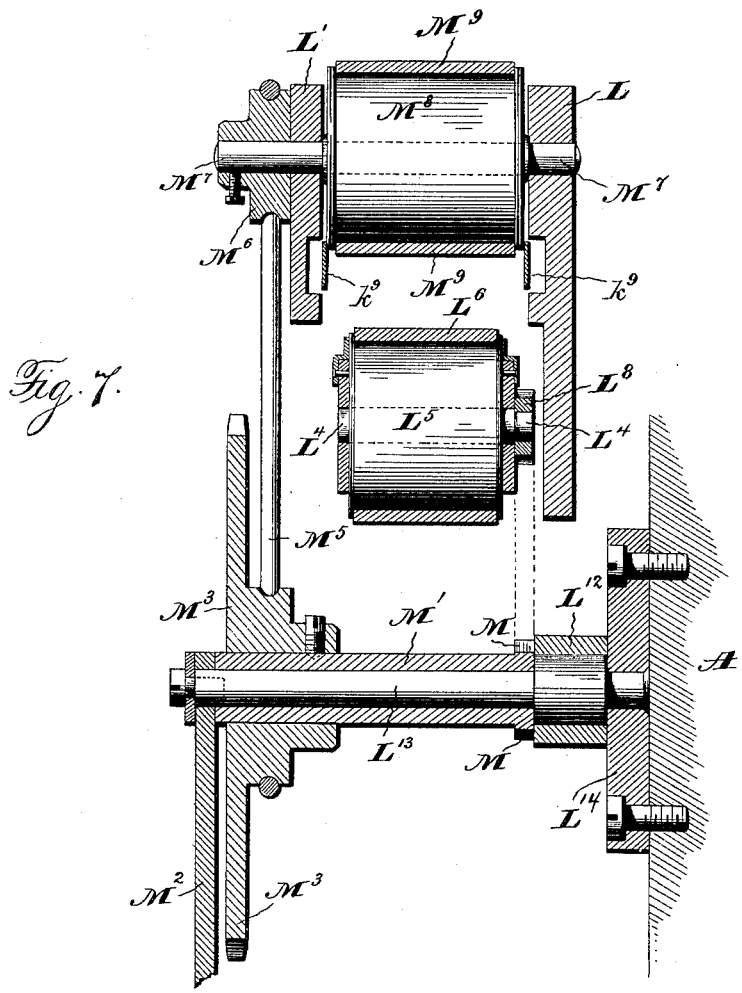
Fig. 7.
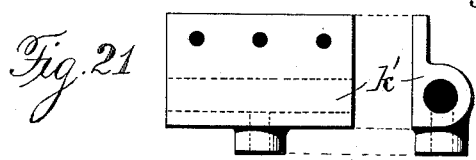
Fig. 21.
Fig. 22.  Fig. 23.
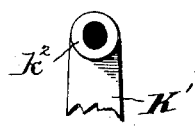
Witnesses:
Jas. E. Hutchinson
Henry C. Hazard
Inventor.
Jacob P. Wright
by Prindle and Russell
his Attorneys (No Model.)  10 Sheets—Sheet 7.

J. P. WRIGHT.
BOX FILLING MACHINE.

No. 595,234.  Patented Dec. 7, 1897.

Witnesses:
Jas. E. Hutchinson
Henry C. Hazard

Inventor.
Jacob P. Wright
by Brindle and Russell
his Attorneys

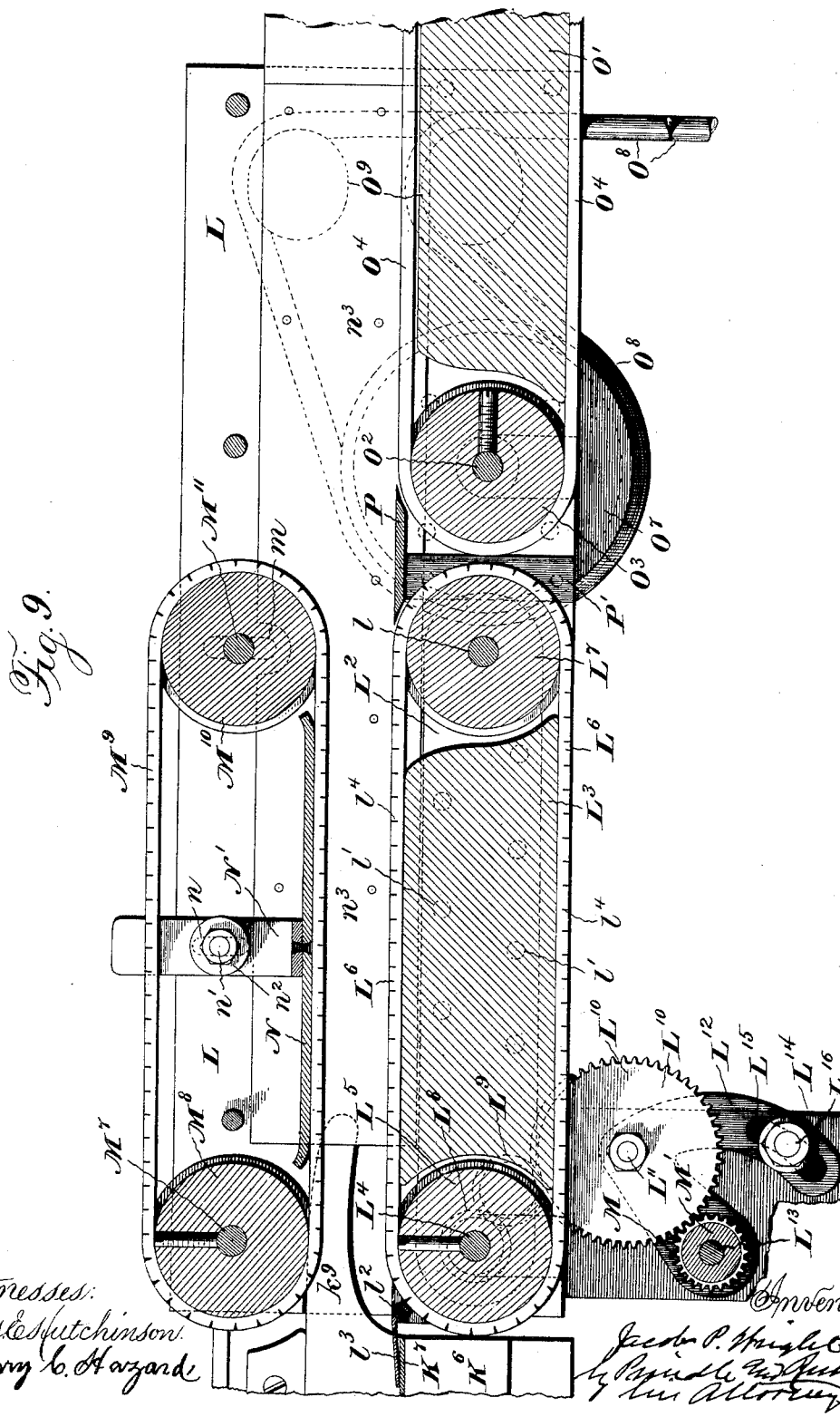

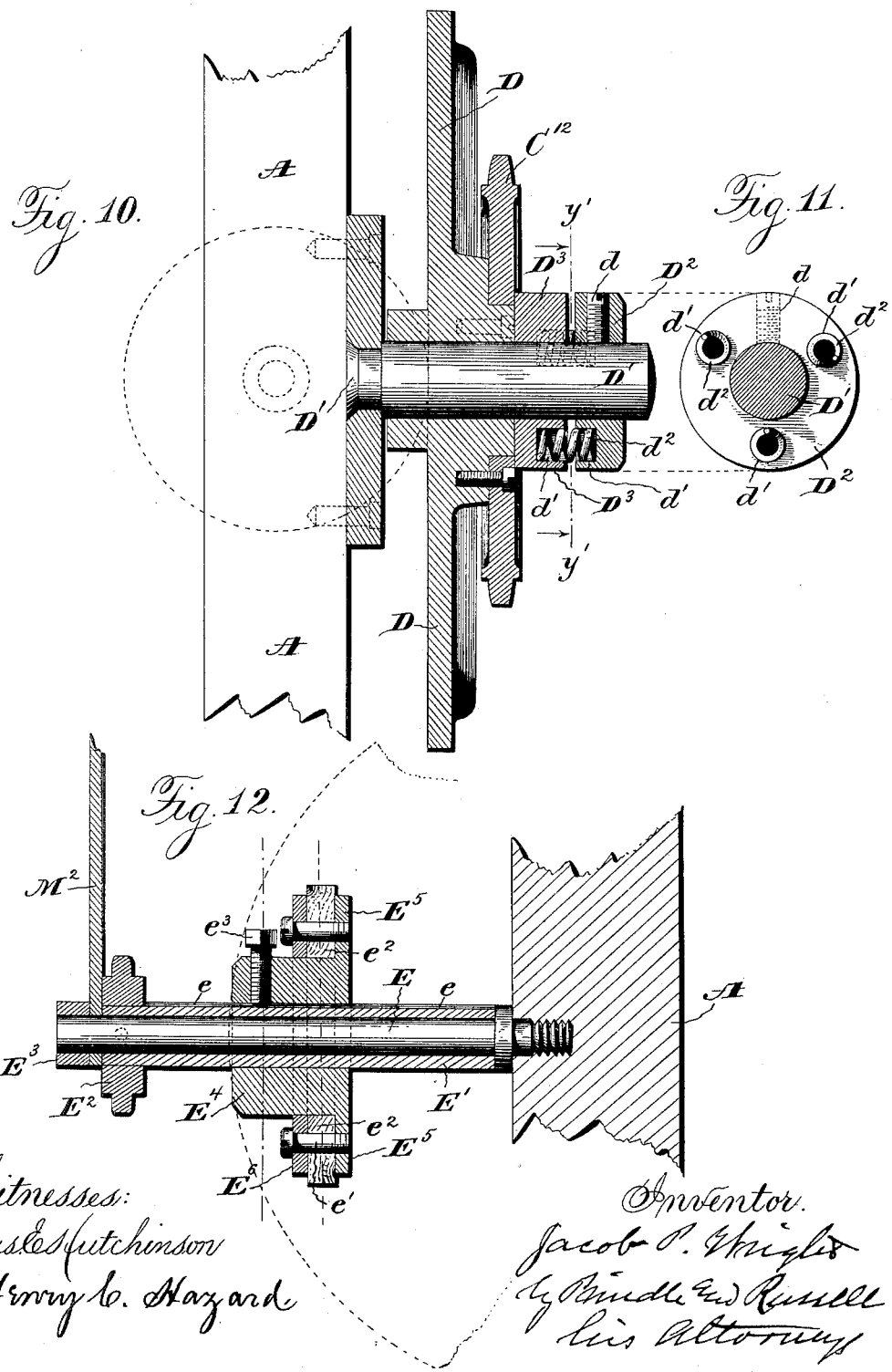

(No Model.) 10 Sheets—Sheet 10.
J. P. WRIGHT.
BOX FILLING MACHINE.
No. 595,234. Patented Dec. 7, 1897.
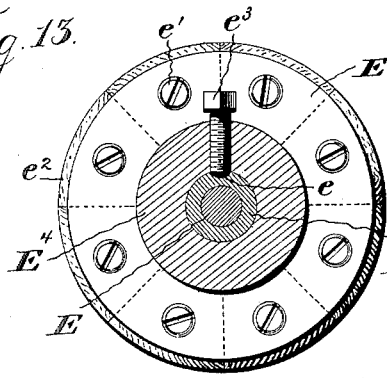
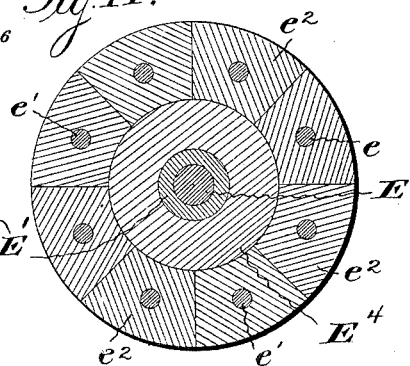
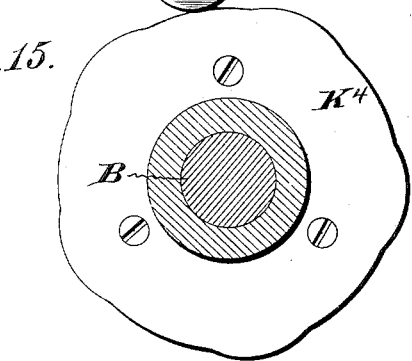
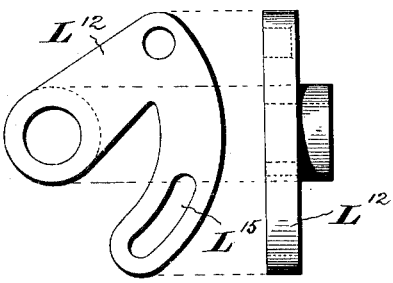
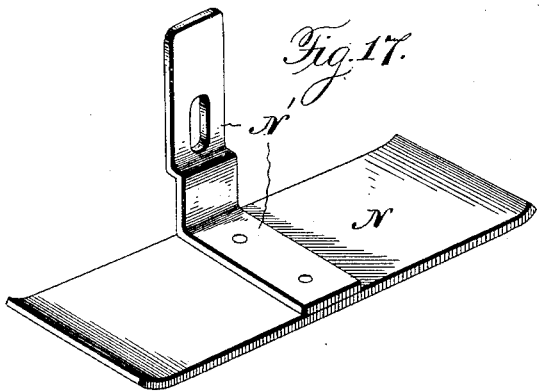
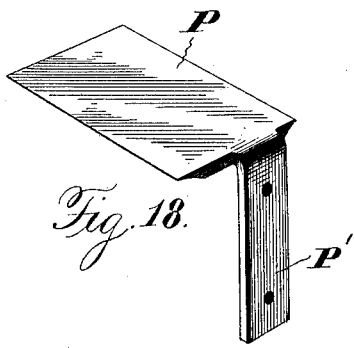
Witnesses:
Jas. E. Hutchinson.
Henry C. Hazard.
Inventor.
Jacob P. Wright
by Pindle and Russell
his attorneys
THE NORRIS PETERS CO., PHOTO-LITHO., WASHINGTON, D. C.

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS.

BOX-FILLING MACHINE.

SPECIFICATION forming part of Letters Patent No. 595,234, dated December 7, 1897.

Application filed April 1, 1897. Serial No. 630,290. (No model.)

*To all whom it may concern:*

Be it known that I, JACOB P. WRIGHT, of New Haven, in the county of New Haven, and in the State of Connecticut, have invented certain new and useful Improvements in Box-Filling Machines; and I do hereby declare that the following is a full, clear, and exact description thereof, reference being had to the accompanying drawings, in which—

Figure 8:
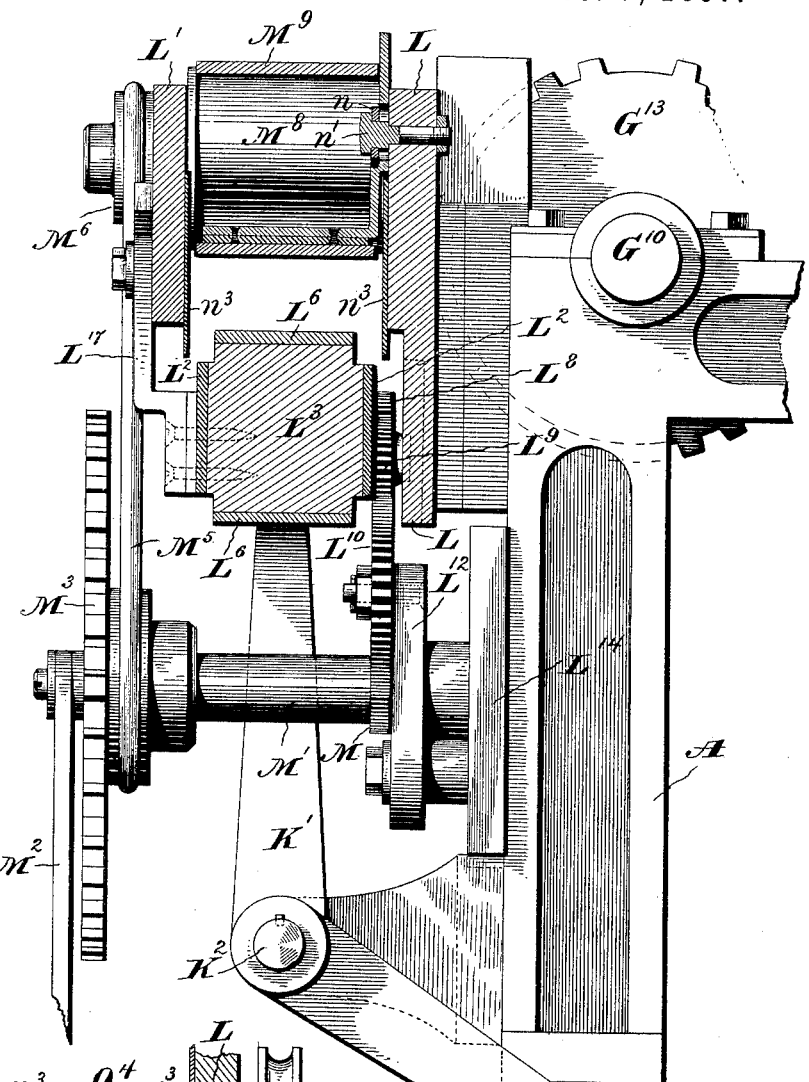
Figure 24:
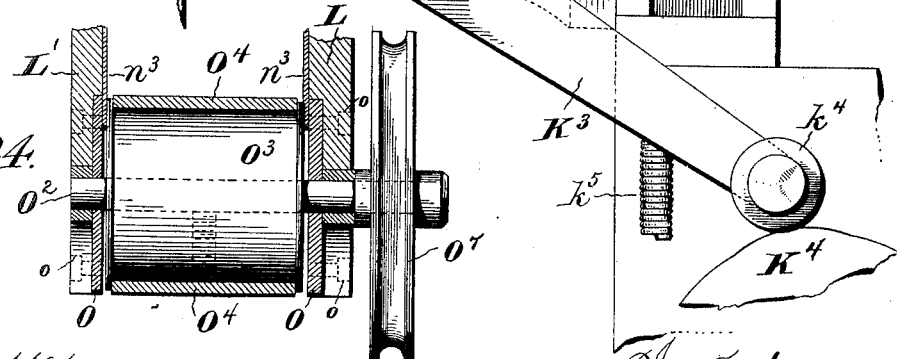

Figure 1 shows a view of my improved box-filling machine in front elevation; Fig. 2, a plan view of the same; Fig. 3, a view of a section on line $x$ $x$ of Fig. 2; Fig. 4, a view of my mechanism in side elevation; Fig. 5, a similar view looking at the other side; Fig. 6, a view, on an enlarged scale, of a section on line $y$ $y$ of Figs. 1 and 2; Fig. 7, a similar view of a section on line $z$ $z$ of Fig. 1; Fig. 8, a similar view of a section on line $x'$ $x'$ of Fig. 1; Fig. 9, a detail view showing in longitudinal section, on an enlarged scale, the box-feeding device and part of the box-supplying device; Fig. 10, a detail sectional view showing, on an enlarged scale, the friction-disk and sprocket-wheel with the means for journaling and supporting the disk; Fig. 11, a view of a section on line $y'$ $y'$ of Fig. 10; Fig. 12, a similar view of the adjustable friction-wheel and the sprocket driven thereby with the means for supporting such parts; Fig. 13, a detail view showing the friction-wheel in side elevation; Fig. 14, a view of a transverse section of such wheel; Fig. 15, a detail view showing in side elevation the cam for vibrating the lever to shake the filling-trough; Fig. 16, a detail view showing in side and end elevation the adjustable swinging arm carrying the gear for transmitting power to the means for driving the lower feed-belt; Fig. 17, a detail perspective view showing the pressure-shoe for holding down the lower portion of the upper feed-belt; Fig. 18, a similar view showing the bridge for bridging over the space between the box-supplying belt and the lower feed-belt; Fig. 19, a detail perspective view of the wooden interior or body of the filling-trough with the false bottom therein; Fig. 20, a view of a section on line $z'$ $z'$ of Fig. 19; Figs. 21 and 22, detail views showing, respectively in side and front elevation, one of the tubular guide-pieces attached to the under side of the filling-trough; Fig. 23, a detail view showing in side elevation the upper end of one of the arms for shaking the filling-trough, and Fig. 24 a view of a section on line $x^2$ $x^2$ of Fig. 1.

Letters of like name and kind refer to like parts in each of the figures.

The object of my invention is to provide an improved mechanism adapted to fill boxes with matches or sticks, strips, bars, or pieces of other material; and to this end my invention consists in the mechanism and in the construction and arrangement of the parts thereof, as hereinafter specified.

While I shall show and describe my invention herein as applied to a match-making machine so as to be used in the boxing of matches, I desire it to be understood that I do not intend to limit myself to such application, but contemplate using my box-filling mechanism for filling boxes with other materials than matches, such other materials being in strips, sticks, bars, or wires of any desired substance or formation.

In the drawings of this case my invention is shown as applied to a match-making machine which has as a carrier for the match-splints while being treated and made into matches and for the matches after they have been completed a series of perforated plates, each having rows of perforations adapted to receive the match-sticks. Only a portion of the match-making machine is shown, as my invention has nothing to do with the means for making and sticking the splints or for treating such splints in the manufacture of the matches therefrom.

In the drawings, A A designate a portion of the frame of the match-making machine to which my invention is to be shown as applied, and B designates the driving-shaft of such machine, journaled in suitable bearings in frame A A and to be driven by suitable gearing or connections from any desired motor or source of power.

Fixed upon shaft B is a pinion C, which meshes with and drives the gear-wheel C', fixed upon shaft $C^2$, journaled on the frame. A sprocket-wheel $C^3$ is also fixed upon shaft B and drives the sprocket-chain $C^4$, which drives the sprocket-wheel $C^5$, fixed upon shaft $C^6$, which is journaled in suitable bearings on frame A A and has attached to it a pinion $C^7$, which meshes with and drives the gear-wheel $C^8$, fixed upon shaft $C^9$. This shaft being journaled upon frame A A carries fixed upon it a sprocket-wheel $C^{10}$, actuating the sprocket-chain $C^{11}$, running around and driving the sprocket-wheel $C^{12}$, which is fixed upon the hub of a friction-disk D, journaled upon a stud-shaft D', secured to the side of frame A and carrying a collar $D^2$, fixed to it by set-screw $d$ at a point beyond the outer face of the friction-disk hub. Between this fixed collar and hub there is on the stud-shaft D' a loose collar $D^3$, containing in its side toward the fixed collar a series of recesses $d'$ $d'$ $d'$ in the inner or opposing face of the fixed collar. Springs $d^2$ $d^2$ $d^2$, having their opposite ends seated in the recesses in the fixed and movable collars, serve to force the movable collar $D^3$ against the hub of the friction-disk D, and so press such hub and disk with a yielding pressure inward on the stud-shaft toward the frame A A for a purpose to be explained hereinafter. A second stud-shaft E, secured to the frame A A at right angles to the stud-shaft D', carries journaled upon it a sleeve or quill E', provided with a longitudinal groove $e$, and carrying fixed upon or made in one piece with it a pinion $E^2$. A brace-rod $E^3$, secured at one end to frame A A, has at its other end an opening to receive and support the outer end of the stud-shaft E.

Upon the quill or sleeve E' is a friction-wheel to engage the flat surface of the friction-disk D and be rotated thereby as the disk is rotated. Such friction-wheel, as shown, consists of a sleeve $E^4$ with the projecting peripheral flange $E^5$, an annular plate $E^6$, surrounding the sleeve $E^4$ and secured to the flange $E^5$ by screws $e'$ $e'$, so as to clamp between it and such flange the blocks $e^2$ $e^2$ $e^2$ of wood or other suitable material, having their outer faces made concentric with the flange $E^5$ and projecting a short distance beyond the same, so that the surface of the friction-wheel which is to come in contact with the side face of the friction-disk D will be formed of the wood or other material of the blocks. Instead of the wooden blocks I contemplate using blocks of any other material capable of affording a good frictional hold upon the face of the friction-disk D, or the wood or other material, instead of being used, as shown and described, in a series of blocks of which the tread of the friction-wheel is built up, may be in the form of a solid ring of greater diameter than the flange $E^5$. A set-screw $e^3$, tapped through the sleeve $E^4$ and engaging the groove $e$ in the quill or sleeve E', serves to secure the friction-wheel to the latter at any desired point along the same, the purpose and object of the described connection between the sleeves E' and $E^4$ being to provide for the ready adjustment of the friction-wheel to bring its point of contact with the face of the friction-disk D nearer to or farther from the center of such face in order to diminish or increase the speed with which the friction-wheel will be driven with reference to the speed of rotation of the disk. The springs $d^2$ $d^2$ $d^2$, forcing the collar $D^3$ and the disk D inward upon the stud-shaft D' with a yielding pressure, as hereinbefore described, serve to keep the friction-disk pressed against the periphery of the friction-wheel on the quill or sleeve E', so that a good frictional contact between the friction-wheel periphery and the face of the friction-disk will always be maintained unaffected by wear of the contacting surfaces.

The shaft $C^2$ carries fixed upon it a cam, (indicated in dotted lines at F in Fig. 4,) which, engaging a pin $f$ on a reciprocating frame F', having a slot $f'$ embracing shaft $C^2$, reciprocates such frame and the rod $F^2$, attached thereto. This rod swings the arm $F^3$, to which its outer end is pivotally connected, and so rocks the shaft $F^4$, upon which the arm $F^3$ is fixed. This rock-shaft $F^4$, journaled in suitable bearings on the frame, carries two arms $F^5$, which are connected by rods $F^6$ $F^6$ with the reciprocating head $F^7$, moving toward and from the carrier, a portion of which is shown in the drawings, consisting of a series of plates G G, hinged together, each of which is provided with a series of transverse rows of perforations $g$ $g$ to receive the splints or sticks of the matches. As shown, these carrier-plates are provided on their backs or rear sides with spring-clamps $g'$ $g'$ to receive and grasp portions of the splints thrust through and beyond the plate-perforations. This form of carrier with the spring-clamps is, however, not necessary to the successful operation of my boxing mechanism. Any other form of carrier preferably arranged to carry the matches in parallel transverse rows can be used without involving any departure from my invention.

Attached to shaft $C^2$ is an eccentric G', actuating an eccentric-strap $G^2$, which is connected by rod $G^3$ with the rocking disk $G^4$, journaled upon shaft $G^5$, supported in suitable bearings in frame A A. This disk carries a pivoted pawl $G^6$, engaging a ratchet-wheel $G^7$ on shaft $G^5$ and is connected by rod $G^8$ with the rocking disk $G^9$, journaled on shaft $G^{10}$, which is supported in suitable bearings on frame A A and is provided with a ratchet-wheel $G^{11}$, fixed upon it, engaged by the pivoted pawl $G^{12}$ on disk $G^9$. The shaft $G^{10}$ carries a pair of toothed wheels $G^{13}$ $G^{13}$, which mesh with the rack-teeth $g^2$ $g^2$ on the backs of the carrier-plates G G. With this construction as the shaft $C^2$ is rotated the pawl-disk $G^9$ will be rocked once, and the ratchet-wheel $G^{11}$ will be moved one tooth for each rotation of the shaft $C^2$, with the result that the toothed wheels $G^{13}$ $G^{13}$ will be rotated to move the connected carrier-plates forward an amount equal to the distance between two adjoining rows of perforations in the plates, so that each movement of the plates will bring a new row of perforations opposite a given line.

The reciprocating head $F^7$, hereinbefore described, having a forward-and-back movement over guides, one of which is shown at $F^8$ in Fig. 6, is provided with a series of pins $f'$ $f'$, situated so that as the carrier-plates G G come to rest after each forward step in their travel a row of perforations in one of the plates will be opposite the pins $f'$ $f'$ and each pin will be in line with one of the perforations, so that a forward movement of the head will cause the pins to engage the ends of the match-splints which are in the plate-perforations and will drive the matches out of the plate. The cam F and eccentric G' on shaft $C^2$ are so timed relatively that the head $F^7$ will be moved forward to eject a row of matches from the carrier and returned to take its ejecting-pins $f'$ $f'$ away from the match-stick-holding devices of the carrier-plate while the carrier is at rest after a forward step in its travel has been completed and before another step is begun by the ratchet feed mechanism described.

The shaft $G^5$ can be provided with a pair of toothed wheels like the ones $G^{13}$ $G^{13}$ on shaft $G^{10}$ to engage the rack-teeth $g^2 g^2$ on the carrier-plates at another point in the travel of the carrier; but such wheels on shaft $G^5$ are not shown in the drawings, and need not be, as the particular means used for moving and supporting the carrier at the various points in the travel of the latter can be varied as desired without involving departure from my invention.

With the mechanism as described up to this point and the carrier-plates supplied with and carrying rows of matches as the machine operates the rows of matches will be successively ejected from the carrier as they reach a certain point in the travel of the carrier, and the matches when ejected will fall down in a stream, formed of rows or layers of matches closely following each other.

At the point where the matches are ejected from the carrier I provide a series of thin upright parallel plates H, arranged so that each match in a perforation of one of the plates G will be separated from the adjoining splints in the same row by one of the plates H. These latter plates, extending from a point below the place where the matches are ejected from the carrier upward for some distance above such place, have their upper edges inclined downward and outward, as shown best in Fig. 6, and their outer ends standing slightly within the plane of travel of the match-heads, so that the plates cannot come in contact with such heads as the matches are moved downward between the plates by the travel of the carrier. All danger of firing the matches by the contact of the head of any match with the division-plates H H is then avoided, while such plates, extending outward on opposite sides of the sticks of the matches held in the carrier, will effectually prevent any of such matches as ejected from the carrier from swinging to one side or the other, so as to be at an angle to the adjoining matches.

The division-plates, extending, as shown, a short distance below the point where the matches are ejected from the carrier, will not only cause them to remain substantially parallel to each other just as they are pushed out of the carrier, but will keep them from getting out of parallelism in a horizontal plane until they are well started down in their fall, and can consequently have no longer any tendency to swing to one side or the other. The plates H H are preferably held in grooves in upwardly-projecting fingers H' H' on the upright plate $H^2$, supported from the frame A A and extending across in front of and close to the outer face of the carrier. The fingers H' H' are preferably formed by slotting the plate $H^2$ from its upper edge downward, as shown in Fig. 3, the slots terminating at a point just below the place where the matches are ejected from the carrier and having a width just sufficient to permit the downward travel of the match-sticks through them as the carrier moves the matches toward the point of ejectment. The fingers H' H' extend out from the plane of the face of the carrier-plates a sufficient distance to be capable of acting to straighten up into perfect parallelism with the adjoining matches any matches that may have become inclined to one side or the other of the carrier before the plate $H^2$ is reached. To insure the ready passage of the matches carried by the carrier into the slots of the plate $H^2$ and past the fingers H' H' and to facilitate the straightening up of any inclined matches, the upper ends of said fingers are made wedge-shaped, being inclined on opposite sides, as shown in Figs. 3 and 6.

Extending across in front of the carrier below the place where the matches are ejected from the latter is the box-filling trough K, supported upon two or more horizontal guide studs or pins $k$ $k$, extending out from the plate $H^2$ and engaging tubular guide-pieces $k'$ $k'$, secured to the under side of the trough. (See Figs. 1, 3, 6, 21, and 22.) The openings in these guide-pieces engage the pins $k$ $k$, so that the trough will be capable of free movement horizontally toward and from the plate $H^2$ and the carrier. Such movement is imparted to the trough by the swinging arms K' K', secured to the rock-shaft $K^2$ and having in their upper portions openings $k^2$ $k^2$, somewhat elongated up and down, as shown in Figs. 3 and 23, engaging pins $k^3$ $k^3$, secured in the guide-pieces $k'$ $k'$.

The rock-shaft $K^2$ being journaled in bearings on frame A A has fixed upon one end the arm $K^3$, carrying a bearing, preferably consisting of an antifriction-roller $k^4$, engaging a cam $K^4$, rotating with shaft B. A spring $k^5$, attached at one end to the frame A A and at the other to the arm $K^3$, serves to hold the latter with its roller bearing against the periphery of cam $K^4$, which is shaped so that in conjunction with the spring $k^5$ it will give the arm $K^3$ a series of short vibrations for each revolution of the cam. (See Figs. 1, 2, and 15.) These vibrations of arm $K^3$ being transmitted through rock-shaft $K^2$, arms $K'K'$, pins $k^3 k^3$, and guide-pieces $k' k'$ cause the filling-trough K to be vibrated horizontally upon the supporting guide pins or studs $k k$ for a purpose to be explained hereinafter.

The trough K is preferably constructed as shown in the drawings—that is, with its sides composed of upright parallel longitudinally-extending thin plates $K^5 K^5$, which are best made of metal, and the body $K^6$, of wood, to which the plates $K^5 K^5$ are secured by screws $k^6$. Within this trough above the wooden body $K^6$ is a removable bottom $K^7$, preferably made of metal and secured in place by ribs $k^7 k^7$ on its under side extending down a short distance into rabbets on opposite sides of the body $K^6$, and lugs $k^8 k^8$, extending down into recesses in the front side of the body $K^6$ and fastened there by some of the screws $k^6$, as indicated in Figs. 1, 19, and 20. This bottom $K^7$ is made removable in order that it may be readily taken out and replaced by one which will stand higher in the trough, the object being to provide for using a higher bottom where shallower boxes are to be filled in order that whatever the depth of the box being filled may be the upper edges of the box may be made to be always at the same height with reference to the upper edges of the trough sides. A bottom $K^7$, to be lower or higher than that shown in the drawings, will have its lugs $k^8 k^8$ made so that the distance from the body of the bottom to the points where the fastening-screws are to engage them will be shorter or longer than in the case of the bottom shown. The ribs $k^7 k^7$ are also to be made correspondingly of less or greater length than those of the bottom shown in the drawings.

The trough-bottom which is to form a support for the boxes while being filled is preferably made inclined, as shown, from the point where the boxes enter the trough downward to the discharge end of the latter, the purpose of this construction being to gradually lower the boxes as they travel across in front of the carrier-plates G G.

The ends of the side plates $K^5 K^5$ at the entrance end of the filling-trough K are provided with the projecting tongues $k^9 k^9$ to form spring-yielding guides to properly guide the boxes from a box-feeding trough to the filling-trough, notwithstanding the sidewise vibrations of the latter.

The feed-trough from which the boxes to be filled are to be fed to the filling-trough has the inner plate L, which is secured to the frame A A and extends out from the side thereof, and the outer plate L', parallel to the other and connected with the same by connecting-bolts or distance-pieces which can be increased in number and placed anywhere, as desired. Pivoted upon one of these distance-pieces $l$ is a frame consisting of two parallel side plates $L^2 L^2$, connected together by an intervening body $L^3$, preferably of wood, to which the side plates are secured by screws $l'$ or otherwise, as desired. The other end of this pivoted frame has journaled in it a shaft $L^4$, to which is secured between the side plates $L^2 L^2$ a roller $L^5$ for supporting and driving a feed-belt $L^6$, which, from roller $L^5$, runs to and around a supporting-roller $L^7$, journaled upon the distance-piece or bolt $l$. The end of the frame carrying the roller $L^5$ is close to the entrance end of filling-trough K and has pivoted to it at $l^2$ a bridge $l^3$, whose free end rests upon the bottom $K^7$ of the filling-trough, so as to afford a support for the boxes traveling from the feed-belt $L^6$ into the filling-trough, whatever the height of the feed-trough bottom or the position of the free end of the feed-trough with reference to the filling-trough bottom may be. The feed-belt consists of a strip of leather with the flesh side out, in which are made a series of cross-cuts $l^4 l^4$, which make the belt more flexible in a direction to allow it to bend easily around the rollers $L^5 L^7$, while leaving it stiff and rigid against bending on a longitudinal line or turning up at its edges. Such a belt will run easily around the rollers, conforming closely to their peripheries and consequently getting a firm hold on the roller-pulley $L^5$, while keeping its outer face straight from side to side, so that it will get a good hold upon the bottoms of any boxes resting upon it. The wooden body $L^3$ of the swinging frame, carrying the belt $L^6$, is adapted to stand close below and form a support for the upper half of the belt, as indicated in the drawings, so that the belt cannot sag between its driving and supporting rollers, but will run in a straight line there. The shaft $L^4$ carries a driving-pinion $L^8$, meshing with and driven by the gear $L^9$, which in turn is driven by the gear-wheel $L^{10}$, journaled upon a stud $L^{11}$ on a swinging frame $L^{12}$, pivoted upon the stud $L^{13}$, projecting out from plate $L^{14}$, secured to frame A A, Figs. 3, 7, and 8. The frame $L^{12}$ is provided with a slot $L^{15}$, concentric with the swing of the plate about the stud $L^{13}$, through which slot passes the bolt $L^{16}$, which is tapped into plate $L^{14}$ and arranged to clamp the swinging frame securely to such plate, so as to hold it firmly at any point of its swing about the stud $L^{13}$. The gear-wheel $L^{10}$ meshes with a pinion M on the sleeve M', journaled on stud $L^{13}$, and, because of the frame $L^{12}$ being pivoted on this same stud, will always remain in mesh with and be driven by said pinion whatever the position of frame $L^{12}$ may be. The outer end of stud $L^{13}$ is connected by a brace-rod $M^3$ with the corresponding end of stud-shaft E.

Fixed to and rotating with the sleeve M' is a combined sprocket-wheel and band-pulley $M^3$, of which the sprocket-wheel part is driven by a sprocket-chain $M^4$, which in turn is driven by the sprocket-wheel $E^2$ on the rotating quill or sleeve $E'$, hereinbefore described, journaled upon the stud-shaft E. Around the band-pulley part of $M^3$ runs the band $M^5$, which drives a second band-pulley $M^6$, fixed on the shaft $M^7$, journaled in the plates L L' above the shaft $L^4$. The shaft $M^7$ has fixed upon it the belt-driving roller $M^8$, which supports and drives a second feed-belt $M^9$, constructed like feed-belt $L^6$, hereinbefore described, and running from roller $M^8$ to and around the roller $M^{10}$, journaled upon a bolt or distance-piece $M^{11}$, connecting the plates L and L' above the lower belt-roller $L^7$. In order that this bolt or distance-piece $M^{11}$ may be set farther up or lower down, to bring the roller $M^{10}$ farther from or nearer the roller $L^7$, and so adjust the distance between the feed-belts $L^6$ and $M^9$ at the point where the boxes are to pass in between them, the threaded outer ends of the said distance-piece or bolt are made to pass out through the upright slightly-curved slots $m$ $m$ in the plates L L' and are provided with nuts $m'$ $m'$, which when screwed in will clamp the respective plates between them and the ends of the larger main portions of the distance-piece which overlap the inner sides of the slots $m$ $m$, as indicated in Fig. 9.

To provide for a corresponding up-and-down adjustment of the inner end of the swinging frame of the lower feed-belt, I secure to said frame a plate $L^{17}$, having the curved slot $L^{18}$, through which passes a clamping-bolt $L^{19}$, tapped into the plate L', the arrangement being such that with the bolt $L^{19}$ loosened the free inner end of the frame supporting the lower feed-belt roller $L^5$ can be swung up or down to bring such roller and the feed-belt $L^6$, running over it, nearer to or farther from the roller $M^8$ and the portion of the upper feed-belt $M^9$ which runs under the latter roller, and a tightening up of the bolt $L^{19}$ will then clamp the plate $L^{17}$ against plate L', so as to securely fix the end of the lower feed-belt frame at any desired point of adjustment. As the free inner end of the lower feed-belt frame is adjusted up or down, as indicated, the swinging plate or frame $L^{12}$ is correspondingly adjusted to keep the gear-wheel $L^{10}$ in mesh with gear $L^9$, so that the feed-belt-driving roller $L^5$ will always be driven from the pinion M on sleeve M' through the gear-wheels $L^{10}$ $L^9$, pinion $L^8$, and shaft $L^4$. The band-and-pulley connections between the sleeve M' and the shaft $M^7$ are so timed relatively that such shaft will be driven at the same speed as shaft $L^4$, and consequently the two feed-belts will be moved to carry their opposing faces toward the box-filling trough at the same rate. These opposing portions of the feed-belts are to be a sufficient distance apart to engage, respectively, the bottoms and upper edges of the boxes fed along between them. The described construction of these belts, with their box-engaging faces made of the flesh side of leather and slit or cut transversely, enables the belts to get the best hold upon the boxes, so as to feed them along regularly at a given speed without danger of slip and consequent lagging of any box.

The making of the inner portion of the lower feed-belt and the outer portion of the upper feed-belt adjustable, in the manner shown and described, enables me to adjust the distance between the two belts to suit the feeding mechanism for feeding boxes of different depths. If, for instance, with the feed-belts situated as shown in Fig. 9 it be desired to arrange for the feeding of boxes which are higher or of greater depth than the distance between the belts, the belt-roller $M^8$ is lowered and the belt-roller $M^{10}$ is raised a corresponding distance, so that the opposing faces of the two feed-belts, while still being parallel, will stand farther from each other. To press the under portion of the upper feed-belt with a yielding pressure down toward the boxes passing beneath it, I provide the plate N, preferably of metal or other heavy material, resting with its weight upon the upper or inner side of the belt, as shown best in Figs. 8 and 9, such plate being connected with the plate L by an arm N', provided with a slot $n$, through which a bolt $n'$ on plate L loosely passes, having a washer $n^2$ to retain the arm N' in place against plate L, while allowing it to move freely up and down. The plates L and L' are provided with thin plates $n^3$ $n^3$, preferably of brass, attached to their inner sides and projecting down on opposite sides of the upper half or portion of the lower feed-belt $L^6$ to form guides for the opposite sides of the boxes being fed along over such belt. The spring-yielding tongues $k^9$ $k^9$ on the side plates $K^5$ $K^5$ of the filling-trough project outward behind the inner ends of the plates $n^3$ $n^3$, so as to receive the boxes between them as they issue from between the feed-belts and guide them properly into the vibrating filling-trough K.

For supplying the boxes to the feed-belts $L^6$ $M^9$, I provide a supply-trough O, projecting in between the plates L L' to a point close to the lower feed-belt-supporting roller $L^7$ and secured to such plates by screws $o$ $o$ or otherwise, as desired. The sides of this trough, which are preferably of metal, are connected together by a wooden body O', to which the sides are screwed or secured in any desired way. Journaled in these trough sides is a shaft $O^2$, having attached to it between such sides a belt-roller $O^3$, over which runs the box-supplying belt $O^4$, which can be of leather or any other suitable material. At the outer end of the supply-trough this belt runs over a supporting-pulley $O^5$, journaled upon a distance-piece or bolt $O^6$, extending across between the trough sides. The wooden body O', which extends across between the upper and lower arms or portions of the belt $O^4$, has its upper face not supporting, but standing at a short distance below the upper inwardly-traveling portion of the belt upon which the boxes to be supplied are to rest, the object of this arrangement being to allow the belt to yield a little, so that the boxes as they are moved along will be jigged or jarred a little in such a way as to insure their easy movement along past the inclosing sides of the supply-trough. The shaft $O^2$ is driven by a band-pulley $O^7$, which is fixed on it, and is in turn driven by the band $O^8$, which, passing over guide-pulleys $O^9$ $O^9$, runs to and is driven by the band-wheel $O^{10}$, fixed on shaft $C^2$. The band-pulley $O^7$ and wheel $O^{10}$ are of such relative sizes that the roller $O^3$ will drive the supply-belt $O^4$ at a greater speed than the feed-belts $L^6$ and $M^9$, so that the boxes on the supply-belt will be kept packed up to the mouth between the feed-belts, the friction of the fast-traveling supply-belt against their bottoms keeping the boxes moved up closely against each other, so that the feed-belts will be kept fully supplied with boxes closely packed together without any intervals or spaces between them.

To prevent any chance of any of the matches as they are ejected from the carrier-plates G G being thrown out over the outer edge of the filling-trough K, I provide the guard-plate $H^3$, Figs. 1 and 2, which, being attached at its opposite ends to frame A A, extends outward from the frame, so as to provide portions $H^4$ $H^4$ parallel with the division-plates H H, standing close to the end ones of such plates, to prevent the matches which may come on the outer sides of such end plates from swinging toward the side of the frame as they are ejected from the carrier-plates. Between these outwardly-extending portions the plate passes along over the upper edge of the outer side of the filling-trough.

In order to support the boxes at the point where they pass from the supply-belt $O^4$ to the feed-belt $L^6$, I provide a bridge P, consisting of a plate extending from a point close to the upper side of the supply-belt $O^4$ to a point close to and substantially on a level with the portion of the feed-belt $L^6$, which passes inward over the top of roller $L^7$, and a downwardly-projecting arm P', which is secured to the inner side of the feed-trough plate L.

To receive the filled boxes as delivered from the filling-trough, I provide an adjustable receiving-trough R, supported on an arm R' of a plate $R^2$, which is adjustably supported on frame A A by means of bolts $r$ $r$, passing through slots $r'$ $r'$ in the plate. With this construction the trough R can readily be adjusted to bring its bottom on a level with any bottom $K^7$ which may be put in trough K.

The operation of my box-filling mechanism, which will be readily understood from the foregoing description and the drawings, is, briefly, as follows: With the supply-trough O provided with boxes to be filled as the machine operates such boxes will, by the action of the fast-running supply-belt $O^4$, be crowded up toward and into the opening between the two feed-belts $L^6$ and $M^9$. These feed-belts with their transversely-slit outer surfaces engage the bottoms and upper edges, respectively, of the boxes, so as to secure a firm hold upon them. The plate N, pressing with its weight upon the top of the lower portion of the belt $M^9$, causes such portion to run in a straight line parallel to the lower belt and keeps it pressed down upon the upper edges of the boxes. The distance between the feed-belts can be adjusted, as desired, to secure the feeding of boxes of different depths or heights by adjusting the inner end of the swinging frame carrying the roller-shaft $L^4$ up or down, and at the same time correspondingly adjusting the distance-post or bolt $M^{11}$, upon which the upper feed-belt roller $M^{10}$ is journaled, in the manner hereinbefore described, the swinging frame $L^{12}$ being adjusted up or down with the end of the frame carrying shaft $L^4$, so as to keep the gear-wheel $L^{10}$ in mesh with pinion $L^9$. From between the two feed-belts the boxes pass onward between the two yielding spring-tongues $k^9$ $k^9$, which guide them into the shaking filling-trough K, the motion of which will give the boxes a series of short transverse shakes or vibrations while they are passing along between the trough sides. The boxes are pushed along at a regular rate through the filling-trough by the action of the feed-belts upon the boxes behind those in the filling-trough, and as they move onward over the inclined bottom of the filling-trough they receive the matches, which are ejected in rows from the carrier-plates G G by the ejecting devices hereinbefore described. The carrier being moved intermittently forward, so as to bring successive rows of matches quickly opposite the ejecting devices, and the latter being operated to eject each row of matches as it comes opposite the ejecting-pins $f'$ $f'$, the matches will fall from the carrier-plates in a stream of rows or layers, quickly following each other. The boxes being moved slowly across this stream will become more and more filled therefrom as they go on, and if the rate of travel of the box is properly adjusted each box will before leaving or passing beyond the stream of matches be filled therefrom. The rate of travel of the boxes with reference to the feeding down of the matches can be readily adjusted, as desired, by moving the friction-wheel which engages the friction-disk D in or out on the quill or sleeve E' to bring the point of contact between the wheel periphery and the disk nearer to or farther from the center of the face of the latter. The adjustment of the friction-wheel along the quill or sleeve E' can be readily effected by loosening the set-screw $e^3$, sliding the wheel along the sleeve to the desired point, and then tightening up the screw again. It will be understood that with the friction-disk D driven at a uniform rate of speed from the main driving-shaft B of the machine through the connecting-gearing, hereinbefore described, and shown in the drawings, the friction-wheel will be rotated faster or slower, according as it is situated, so as to bring its point of contact with the face of the disk D farther from or nearer to the center of such face and that the feed-belts $L^6$ and $M^9$ will be correspondingly driven faster or slower through the described connections between the rollers driving such belts and the sleeve or quill $E'$, which carries the friction-wheel. As the matches in the perforations of the carrier-plates are brought by the action of the step-by-step carrier-driving devices down to the slots or openings in the plate $H^2$ between the fingers $H'$, any matches which may have become inclined toward one side or the other of the carrier, so as to be out of parallelism with adjoining matches, will be engaged by the inclined sides on the upper ends of the fingers and forced up into position at right angles to the carrier-plate, and consequently parallel to each other and to the other properly-positioned matches in the plate. The sides of the fingers continuing to stand close to the matches passing down between them will keep such matches in their proper positions parallel to each other and at right angles to the carrier-plate until they are ejected from such plate by the pins of the described ejecting mechanism. While the matches are being ejected and for a short time after beginning their fall to the boxes below the division-plates H H keep them from swinging or turning to one side or the other, so as to get out of parallel with each other. The result is that they fall down into the boxes in the filling-trough with their sticks in substantially parallel vertical planes, and when they reach the boxes will fall into positions therein which will be substantially at right angles to the line of travel of the boxes. No shaking or jarring of the boxes in a longitudinal direction or at right angles to the positions which the matches are to occupy in the filled boxes will then be necessary to get the matches in boxes lying across within the latter parallel with each other. The shaking or jarring of the boxes which is necessary is one transverse to the line of travel of the boxes or parallel to the matches as they are to lie in the filled boxes, and this shaking or jarring is given the boxes by the vibration of the filling-trough by the arms $K'$ $K'$ on rock-shaft $K^2$, rocked by the arm $K^3$, which is in turn vibrated by the action of the cam $K^4$ and spring $k^5$. With the boxes as they are being gradually filled during their passage through the filling-trough K and across the stream of falling matches given a series of short transverse vibrations in the manner described the matches, which are apt to fall with the heavier head end lower than the other, will be shaken down into substantially horizontal positions parallel to each other, the direction of the vibrations of the boxes being such as to most quickly and surely cause the matches to so settle, because as they reach the boxes after leaving the guiding division-plates they can be inclined with relation to the positions which they are desired to have in the filled boxes only in vertical planes and not in a horizontal plane. As the boxes are being gradually filled with matches from the loosely-falling substantially continuous stream of matches from the carrier or source of supply, the shaking of the boxes in the manner described, so as to give them a series of short transverse vibrations in a direction parallel to the length of the matches as they are to lie in the filled boxes, will cause the matches as they settle down in the boxes to lie with their sticks or splints close together. The transverse shaking of the boxes will prevent the heads of one layer of matches from resting upon the heads of the next lower layer. Should the heads of one layer fall upon those of the layer below, they will by the motion of the boxes be caused to "shuck" or slide by such heads of the lower layer. This operation will be carried on during the filling of the boxes, so that the heads of adjoining matches will not rest squarely upon each other, but will stand out of line with each other, the result being a more uniform and even filling of the boxes than would be possible where the heads of the matches all rested upon each other and so caused the head ends of the matches, particularly in the upper part of the box, to be much higher than the other ends. The downward incline of the bottom $K^7$ of the filling-trough, over which the boxes pass while being filled, is for the purpose of lowering the boxes gradually as they receive more and more of the matches and the tops of their contents rise within them, so that the distance through which the matches have to fall will always be substantially the same, and they will consequently reach the end of their fall within the boxes under substantially the same conditions.

It will be understood from the explanation given hereinbefore that as boxes of different depths are to be filled by the machine different bottoms $K^7$ for the filling-trough K are to be employed to support the box-bottoms higher or lower, according as the boxes are shallower or deeper ones.

The filling-machine constructed as shown and described is well adapted for use with many different depths of boxes, all that is necessary to be done for changing it for use in filling boxes of a different depth being to adjust the adjustably-supported feed-belts to accommodate the boxes between them, at the same time to move the adjustable frame carrying the gear $L^{10}$, insert the proper bottom $K^7$ in the filling-trough, and adjust the friction-wheel on the quill or sleeve $E'$ to make the feeding of the boxes and consequently their passage along in the feeding-trough faster or slower, according as the boxes to be filled are shallower or deeper.

Having thus described my invention, what I claim is—

1. In a box-filling machine, in combination with a trough through which the boxes are fed, guiding-pieces attached to the trough and engaging guide-pins extending in a direction transverse to the trough, pins on the guide-pieces, swinging arms engaging the latter pins, a rock-shaft carrying the arms, another arm on the shaft, a cam engaging a bearing on this arm, and a spring pressing the arm toward the cam, substantially as and for the purpose shown.

2. In a box-filling machine, in combination with means for feeding the boxes, a sidewise-shaking trough receiving the boxes from the feeding means, and having yielding guiding-tongues projecting on opposite sides of the path of the boxes issuing from the box-feeding means, and means for shaking the trough, substantially as and for the purpose set forth.

3. In a box-filling machine, in combination with means for feeding the boxes, and guiding-plates on opposite sides of the feeding devices, a sidewise-shaking trough receiving the boxes from the feeding devices, and having yielding tongues projecting out beyond the outer sides of the guiding-plates, and means for shaking the trough, substantially as and for the purpose described.

4. In a feeding mechanism, a feed-belt having its outer face provided with a series of transverse slits or cuts extending part way through the belt made so as to be substantially closed when the belt is straightened out, in combination with means for supporting such belt, substantially as and for the purpose specified.

5. In a feeding mechanism, a feed-belt of leather having its outer face provided with a series of transverse cuts or slits extending part way through the belt, in combination with means for supporting such belt, substantially as and for the purpose shown.

6. In a feeding mechanism, a feed-belt of leather, having its flesh side outward, slit or cut transversely, with the slits or cuts extending part way through the belt, and means for supporting the belt, substantially as and for the purpose set forth.

7. In a feeding mechanism, in combination with a driving-roller and means for turning the same, a supporting-roller and a belt running over such rollers, having, in its outer face, a series of transverse cuts or slits extending part way through it adapted to be substantially closed, when the belt is straightened out, substantially as and for the purpose described.

8. In a feeding mechanism, in combination with two parallel belts, each having, in its outer face, a series of transverse cuts or slits extending part way through it adapted to be substantially closed, when the belt is straightened out, driving and supporting rollers for the two belts, and means for rotating the driving-rollers, substantially as and for the purpose specified.

9. In a feeding mechanism, in combination with the two feed-belts, each having an inner and an outer roller, to support the belt at the delivery and receiving ends, respectively, of the feeding mechanism, adjustable bearings for the inner roller of one belt and the outer roller of the other, each adapted to allow the respective roller to be set nearer to or farther from the adjoining roller of the other belt, means for driving the unadjustable inner roller of one belt, an adjustable frame carrying a gear-wheel driven from any suitable source of power, and gearing supported on the adjustable support of the inner roller of the other belt, adapted to be driven by the gear-wheel on the adjustable frame, substantially as and for the purpose specified.

10. In a machine for filling boxes with strips or sticks of material, in combination with means for supplying the material to be boxed in a substantially continuous stream of loosely-falling material, such stream having a width greater than the length of one of the boxes to be filled, means for feeding the boxes across such stream, the rate of feed of the material being so proportioned to the speed of travel of the boxes, that the latter will be gradually filled from such stream, as they pass across it, and means for giving the boxes a series of sidewise shakes, transverse to their travel and substantially in the direction of the greatest dimension of the strips or sticks of the material to be boxed, while the boxes are passing through the stream of material, substantially as and for the purpose specified.

11. In a machine for filling boxes with strips or sticks of material, in combination with means for supplying the material which is to be boxed, in a substantially continuous loosely-falling stream, of a width greater than the length of a box to be filled, a trough extending across such stream, means for feeding boxes through such trough, the rate of supply of material to be boxed being so proportioned to the speed of travel of the boxes, that the latter will be gradually filled from the stream, as they pass across the same, and means for giving the trough a series of transverse shakes substantially in the direction of the greatest dimension of the strips or sticks of material to be boxed, while the boxes are passing across the stream of material, substantially as and for the purpose specified.

12. In a machine for filling boxes with matches, in combination with means for supplying the matches in a substantially continuous loosely-falling stream, of a width greater than the length of a box to be filled, feeding devices to cause the boxes to travel across such stream with a speed so proportioned to the rate of supply of the material, that the boxes will become gradually filled from such stream, as they pass across it, and means for giving the boxes, while passing across the stream, a series of transverse shakes, in a direction substantially parallel to the matches, as they are to lie in the filled boxes, substantially as and for the purpose set forth.

13. In a machine for filling boxes with matches, in combination with means for supplying the matches in a substantially continuous loosely-falling stream, of a width greater than the length of a box to be filled, a shaking trough through which the boxes are passed, extending in a direction transverse to such stream, means for feeding the boxes to and through such trough at a speed so proportioned to the rate of supply of the matches, that the boxes will become gradually filled from the stream of matches as they pass across it, and means for shaking the trough transversely from side to side, while the boxes are passing through the same, the direction of shaking of the trough being substantially parallel to the matches as they are to lie in the filled boxes, substantially as and for the purpose described.

14. In a machine for filling boxes with matches, in combination with a source of supply of matches, delivering the same in a series of rows or layers closely following each other, so as to form a stream of such rows or layers, of a width greater than the length of one of the boxes to be filled, means for passing a series of boxes to be filled across the stream of matches in a direction substantially at right angles to the matches, and means for giving the boxes, as they pass across the stream of matches, a series of sidewise shakes, in a direction substantially parallel to the position which the matches are to have in the filled boxes, substantially as described.

15. In a machine for filling boxes with matches, in combination with a source of supply of the matches, means for causing such matches to assume positions in parallel planes, means for passing the boxes to be filled across below the path of the matches, as the latter pass beyond the means for causing them to assume the positions in parallel planes, and means for giving the boxes, as they pass along, a series of sidewise shakes, in a direction substantially parallel to the position which the matches are to have in the filled boxes, substantially as described.

16. In a machine for filling boxes with matches, in combination with a source of supply of matches, and a series of division-plates, between which the matches pass, means for passing the boxes to be filled below the division-plates, feed devices for feeding the boxes along, and means for giving the boxes, as they pass along, a series of sidewise shakes, in a direction substantially parallel to the division-plates, substantially as and for the purpose shown.

17. In a machine for filling boxes with matches, in combination with a carrier for the matches, means for ejecting the matches from the carrier, guides to straighten up into parallelism with the other matches any matches which may be inclined to one side or the other, while in the carrier, adapted to act upon the matches before they reach the point of ejectment, means for passing boxes across the stream of matches falling from the carrier, and means for giving such boxes a series of sidewise shakes, as they move across the path of the falling matches, substantially as and for the purpose set forth.

18. In a machine for filling boxes with matches, in combination with a carrier for the matches and ejecting mechanism to eject the matches from the carrier, guide-fingers on opposite sides of which the matches are carried by the carrier, before and until they reach the point of ejectment, means for feeding the boxes across the stream of falling matches, and means for giving the boxes a series of sidewise shakes toward and from the plane of travel of the match-carrier, while they are passing across the stream of matches, substantially as and for the purpose specified.

19. In a machine for filling boxes with matches, in combination with a traveling carrier for the matches, and ejecting mechanism to eject the matches when they reach a given point, guide-fingers close to the carrier, on opposite sides of which the matches in the carrier are carried before they reach the point of ejectment, such fingers having their ends extending rearward with reference to the travel of the carrier beveled off on opposite sides, feed devices for feeding boxes across the path of the matches ejected from the carrier, and means for giving such boxes a series of sidewise shakes, while passing across such path, substantially as and for the purpose described.

20. In a machine for filling boxes with matches, in combination with a source of supply of matches, means for insuring that the matches coming from the source of supply shall lie in substantially parallel vertical planes, means for passing the boxes across the path of the matches in a direction substantially at right angles to such vertical planes, and means for giving the boxes, while so passing, a series of shakes transverse to the line of their travel, substantially as and for the purpose specified.

21. In a machine for filling boxes with matches, in combination with a carrier for the matches and means for ejecting the matches from such carrier, a series of division-plates for dividing and guiding the matches, means for passing the boxes across the stream of matches, and means for giving the boxes a series of sidewise shakes as they are passing across the stream, substantially as and for the purpose shown.

22. In a machine for filling boxes with matches, in combination with a carrier for the matches, and means for ejecting the matches therefrom, a series of upright, parallel division-plates between which the matches in the carrier are moved by the latter before they are ejected therefrom, means for feeding boxes along under such plates, and means for giving the boxes while passing under the plates a series of sidewise shakes transverse to their line of travel, substantially as and for the purpose set forth.

23. In a machine for filling boxes with matches, in combination with a carrier for the matches, and means for causing them to leave the carrier, a series of upright parallel division-plates down between which the matches are carried by the carrier before they leave the same, such plates extending below the point where the matches leave the carrier, feeding devices to cause the boxes to be filled to pass along under the series of plates, and means for giving the boxes while so passing a series of sidewise shakes in a direction transverse to the line of travel of the boxes, substantially as and for the purpose described.

24. In combination with a series of upright division-plates and means for causing the matches or other articles to be boxed to pass and fall down between such plates, a shaking support for the boxes extending along under the series of plates, and means for shaking such support transversely, substantially as and for the purpose specified.

In testimony that I claim the foregoing I have hereunto set my hand this 29th day of March, 1897.

JACOB P. WRIGHT.

Witnesses:
L. H. BEECHER,
H. DAYTON STANNARD.